(12) United States Patent
Aida et al.

(10) Patent No.: US 7,855,002 B2
(45) Date of Patent: Dec. 21, 2010

(54) MAGNETIC DISK SUBSTRATE AND MAGNETIC RECORDING MEDIUM THEREOF

(75) Inventors: Katsuaki Aida, Chiba (JP); Hiroyuki Machida, Ichihara (JP)

(73) Assignee: Showa Denko K.K., Tokyo (JP)

( * ) Notice: Subject to any disclaimer, the term of this patent is extended or adjusted under 35 U.S.C. 154(b) by 237 days.

(21) Appl. No.: 12/095,431

(22) PCT Filed: Nov. 29, 2006

(86) PCT No.: PCT/JP2006/324297
§ 371 (c)(1), (2), (4) Date: May 29, 2008

(87) PCT Pub. No.: WO2007/069501
PCT Pub. Date: Jun. 21, 2007

(65) Prior Publication Data
US 2009/0161242 A1    Jun. 25, 2009

Related U.S. Application Data

(60) Provisional application No. 60/752,394, filed on Dec. 22, 2005.

(30) Foreign Application Priority Data
Dec. 15, 2005   (JP)   ............... 2005-361719

(51) Int. Cl.
G11B 27/36 (2006.01)
G11B 5/00 (2006.01)
C03B 15/00 (2006.01)

(52) U.S. Cl. ................. 428/846.9; 428/848.2; 360/135; 65/61

(58) Field of Classification Search .............. 428/846.9, 428/848, 848.2, 800; 65/30.14, 30.1, 61; 51/307; 360/135; 702/86, 152, 153, 158
See application file for complete search history.

(56) References Cited

U.S. PATENT DOCUMENTS

2002/0159077 A1 * 10/2002 Sakaguchi et al. .......... 356/640

(Continued)

FOREIGN PATENT DOCUMENTS

JP        06-096436 A     4/1994

(Continued)

OTHER PUBLICATIONS

Translation Okuda et al JP 2000-207733 (Jul. 2000).*

(Continued)

*Primary Examiner*—Kevin M. Bernatz
*Assistant Examiner*—Louis Falasco
(74) *Attorney, Agent, or Firm*—Sughrue Mion, PLLC

(57) ABSTRACT

The present invention relates to a magnetic disk substrate, in which an amplitude Wa of a waviness on a surface measured by using an interferometer for a versatile disk at a measuring wave-length of 5.0 mm is within the range of 0.1 nm to 0.5 nm, an average amplitude Wb of a microwaviness generated on the waviness measured by using a microscopy for three-dimensional surface-structural analysis at a measuring wave-length of 30 μm to 200 μm is 0.3 nm or less, and a value calculated by dividing the average amplitude Wb of the microwaviness by the amplitude Wa of the waviness is 0.6 or more.

4 Claims, 3 Drawing Sheets

U.S. PATENT DOCUMENTS

2002/0164505 A1* 11/2002 Yokoyama et al. .......... 428/848
2003/0172677 A1* 9/2003 Miyamoto et al. ......... 65/30.14
2004/0123527 A1* 7/2004 Kitayama et al. ............. 51/307
2004/0162012 A1* 8/2004 Suenaga et al. ............... 451/41
2006/0194080 A1* 8/2006 Ishii et al. ................... 428/800

FOREIGN PATENT DOCUMENTS

| | | |
|---|---|---|
| JP | 2000-207733 A | 7/2000 |
| JP | 2003-223711 A | 8/2003 |
| WO | 2006/022443 * | 3/2006 |

OTHER PUBLICATIONS

Translation Minami et al JP 2003-223711 (Aug. 2008).*

* cited by examiner

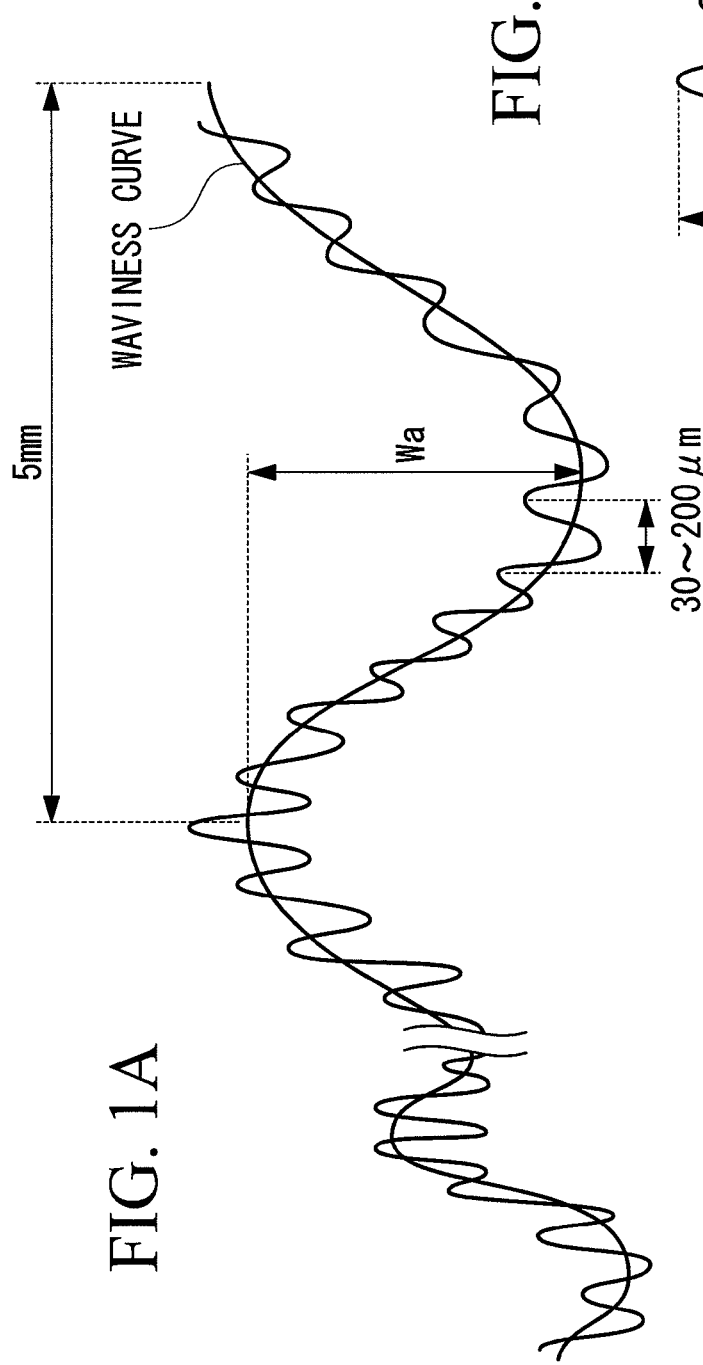
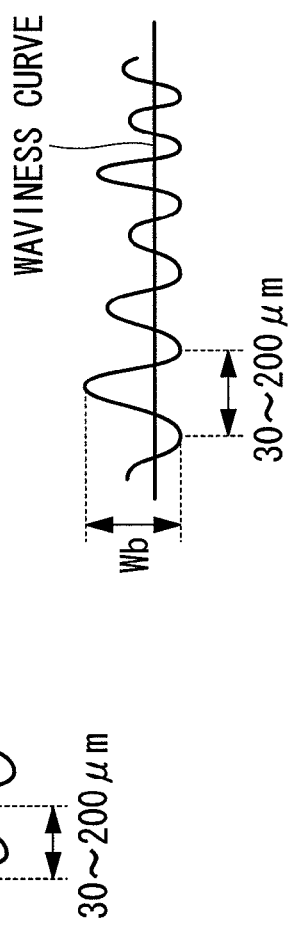
FIG. 1A
FIG. 1B

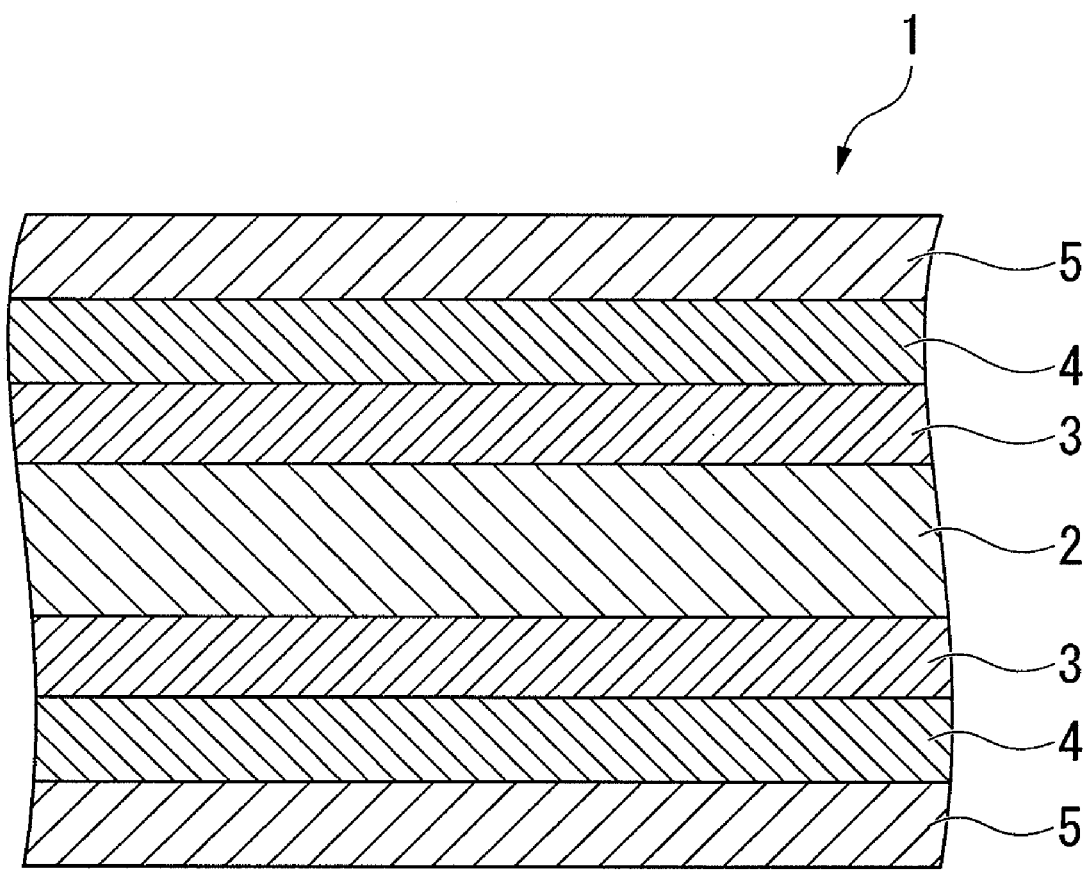

MAGNETIC DISK SUBSTRATE AND MAGNETIC RECORDING MEDIUM THEREOF

CROSS REFERENCE TO RELATED APPLICATIONS

This application claims the priority of Japanese Patent Application No. 2005-361719, filed on Dec. 15, 2005, and claims benefit of U.S. Provisional Application No. 60/752,394, filed on Dec. 22, 2005, the contents of which are incorporated herein by reference.

TECHNICAL FIELD

The present invention relates to a magnetic disk substrate, and a magnetic recording medium using the same. More specifically, the present invention relates to a magnetic disk substrate which can achieve a magnetic recording medium which enables reading and writing that is compatible with high recording density.

BACKGROUND ART

In recent years, much higher recording density is expected in magnetic disks. In order to meet this requirement, extensive studies have been made on the surface topography of the substrate used in magnetic disks. For example, patent document 1 proposes a condition in which the amplitude of the surface waviness of a wave-length from 0.3 mm to 3.0 mm is made 50 nm or less, and the surface roughness is modified to Ra=2 nm to 7 nm, and $R_{max}$=10 nm to 60 nm. Also, patent document 2, for example, proposes a magnetic disk in which the microwaviness of the surface has a cycle of 0.1 mm to 5 mm, and amplitude of 0.1 nm to 1 nm.

However, in the arts described in patent documents 1 and 2, there are instances where the magnetic head collides with the irregularities on the surface of the substrate when the magnetic head moves thereover, and these could not sufficiently comply with the above-mentioned requirement of high recording density.

Furthermore, patent document 3 describes a glass substrate in which, letting the height of the waviness, which generates on the surface of the substrate, measured by using an interferometer for versatile disks at a measuring wave-length (λ) of 0.4 mm to 5.0 mm be Wa (nm), and letting the height of the microwaviness, which generates on the waviness, measured by using a microscopy for three-dimensional surface-structural analysis at a measuring wave-length (λ) of 0.2 mm to 1.4 mm be NRa (nm), Wa is 0.8 or less, and the ratio of NRa to Wa (NRa/Wa) is 1/1.5 or less if Wa is 0.4 or less; ½ or less if Wa is greater than 0.4 to 0.5; and ⅓ or less if Wa is greater than 0.5 to 0.8.

Patent Document 1: Japanese Unexamined Patent Application, Publication No. H6-96436
Patent Document 2: Japanese Unexamined Patent Application, Publication No. 2000-207733
Patent Document 3: Japanese Unexamined Patent Application, Publication No. 2003-223711

DISCLOSURE OF INVENTION

However, the glass substrate described in patent document 3 was of no practical use because it was difficult to mass-produce. Specifically, the value of Wa in substrates currently mass-produced is about 0.3 nm, but suppose that the value of Wa is 0.3 nm in the art of patent document 3, the ratio of NRa to Wa (NRa/Wa) would have to be 0.6 or less, and this would require a lot of time and effort for production, worsen the yield, and consequently, it would be difficult to mass-produce.

The present invention results from studies on above-described circumstances, and the object of the present invention is to provide a magnetic disk substrate which can achieve a magnetic recording medium which enables reading and writing that is compatible with high recording density, can be mass-produced, and has excellent electromagnetic conversion characteristics, and to provide a magnetic recording medium using the same.

In order to solve the above-described problems, the inventors discovered that a magnetic disk substrate which can be mass-produced and has excellent electromagnetic conversion characteristics can be obtained by manufacturing the substrate such that the amplitude Wa of the waviness on the surface measured by using an interferometer for versatile disks at a measuring wave-length of 5.0 mm (hereinafter, abbreviated as "the amplitude of the waviness") is within the range of 0.1 nm to 0.5 nm; the average amplitude Wb of the microwaviness generated on the above-mentioned waviness measured by using a microscopy for three-dimensional surface-structural analysis at a measuring wave-length of 30 μm to 200 μm (hereinafter, abbreviated as "the average amplitude of the microwaviness") is 0.3 nm or less; and the value calculated by dividing the average amplitude Wb of the microwaviness by the amplitude Wa of the waviness, namely Wb/Wa, is 0.6 or more.

In addition, in the present invention "the amplitude Wa of the waviness" refers to the amplitude represented by the waviness curve of the reference wave-length of 5.0 mm, as shown in FIG. 1A. Also, as shown in FIG. 1B, "the average amplitude Wb of the microwaviness" refers to the amplitude of the microwaviness generated on the waviness, namely the amplitude of the microwaviness represented if the waviness curve were linear (arithmetic average roughness Ra).

In detail, as the amplitude Wa of the waviness of the substrate becomes large, the magnetic head cannot track the waviness of the substrate in the magnetic recording medium thereof, and there is concern that the output waveform of the electromagnetic conversion is disrupted because of this. If the amplitude Wa of the waviness of the substrate is quite large, then, the magnetic head crashes into the magnetic recording medium. To the contrary, the inventors discovered that a magnetic recording medium with excellent electromagnetic conversion characteristics can be achieved by making the amplitude Wa of the waviness of the substrate less than 0.5 nm.

Also, the inventors confirmed that the output waveform of the electromagnetic conversion of the magnetic recording medium was disrupted irrespective of the amplitude Wa of the waviness of the substrate even if the amplitude Wa of the waviness of the substrate was adjusted to less than 0.5 nm when the flying height of the magnetic head was lowered. Moreover, the inventors found that the disruption of the output waveform got worse as the average amplitude Wb of the microwaviness became large when the amplitude Wa of the waviness of the substrate was made less than 0.5 nm. Then, the inventors discovered that a magnetic recording medium with excellent electromagnetic conversion characteristics can be achieved by making the average amplitude Wb of the microwaviness 0.3 nm or less as well as by making the amplitude Wa of the waviness of the substrate less than 0.5 nm, and further by adjusting the value Wb/Wa to 0.6 or more, which is calculated by dividing the average amplitude Wb of the microwaviness by the amplitude Wa of the waviness.

Also, in terms of electromagnetic conversion characteristics, it is preferable that the amplitude Wa of the waviness of the substrate, and the average amplitude Wb of the microwaviness be much smaller, but it gets difficult to mass-produce as it gets smaller and smaller. For example, in order to make Wb small, it is effective to make the particle size of the abrasive used in the process of polishing the substrate much smaller. However, in this case, the speed of polishing the substrate must be slowed, so productivity decreases. Therefore, the inventors studied the above-described problems, and achieved the present invention. That is, the present invention relates to the followings.

(1) A magnetic disk substrate in which the amplitude Wa of the waviness on the surface measured by using an interferometer for a versatile disk at a measuring wave-length of 5.0 mm is within the range of 0.1 nm to 0.5 nm, the average amplitude Wb of the microwaviness generated on the above-mentioned waviness measured by using a microscopy for three-dimensional surface-structural analysis at a measuring wave-length of 30 μm to 200 μm is 0.3 nm or less, and the value of Wb/Wa, which is calculated by dividing the average amplitude Wb of the microwaviness by the amplitude Wa of the waviness is 0.6 or more.

(2) The magnetic disk substrate according to (1) which is made from glass.

(3) The magnetic disk substrate according to (1) which is made from silicon.

(4) A magnetic recording medium which includes the above-described magnetic disk substrate according to any one of (1) to (3).

According to a magnetic disk substrate of the present invention, in which the amplitude Wa of the waviness is within the range of 0.1 nm to 0.5 nm, the average amplitude Wb of the microwaviness is 0.3 nm or less, and the value calculated by dividing the average amplitude Wb of the microwaviness by the amplitude Wa of the waviness, namely Wb/Wa, is 0.6 or more, a magnetic recording medium which can be mass-produced, has excellent electromagnetic conversion characteristics, and enables reading and writing that is compatible with high recording density can be achieved.

Also, the magnetic recording medium of the present invention enables reading and writing that is compatible with high recording density because it uses the magnetic disk substrate of the present invention.

BRIEF DESCRIPTION OF THE DRAWINGS

FIG. 1A illustrates the amplitude Wa of the waviness.

FIG. 1B illustrates the average amplitude Wb of the microwaviness in the present invention.

FIG. 2 is a diagram showing one example of the magnetic recording medium of the present invention.

BEST MODE FOR CARRYING OUT THE INVENTION

Figure 3:
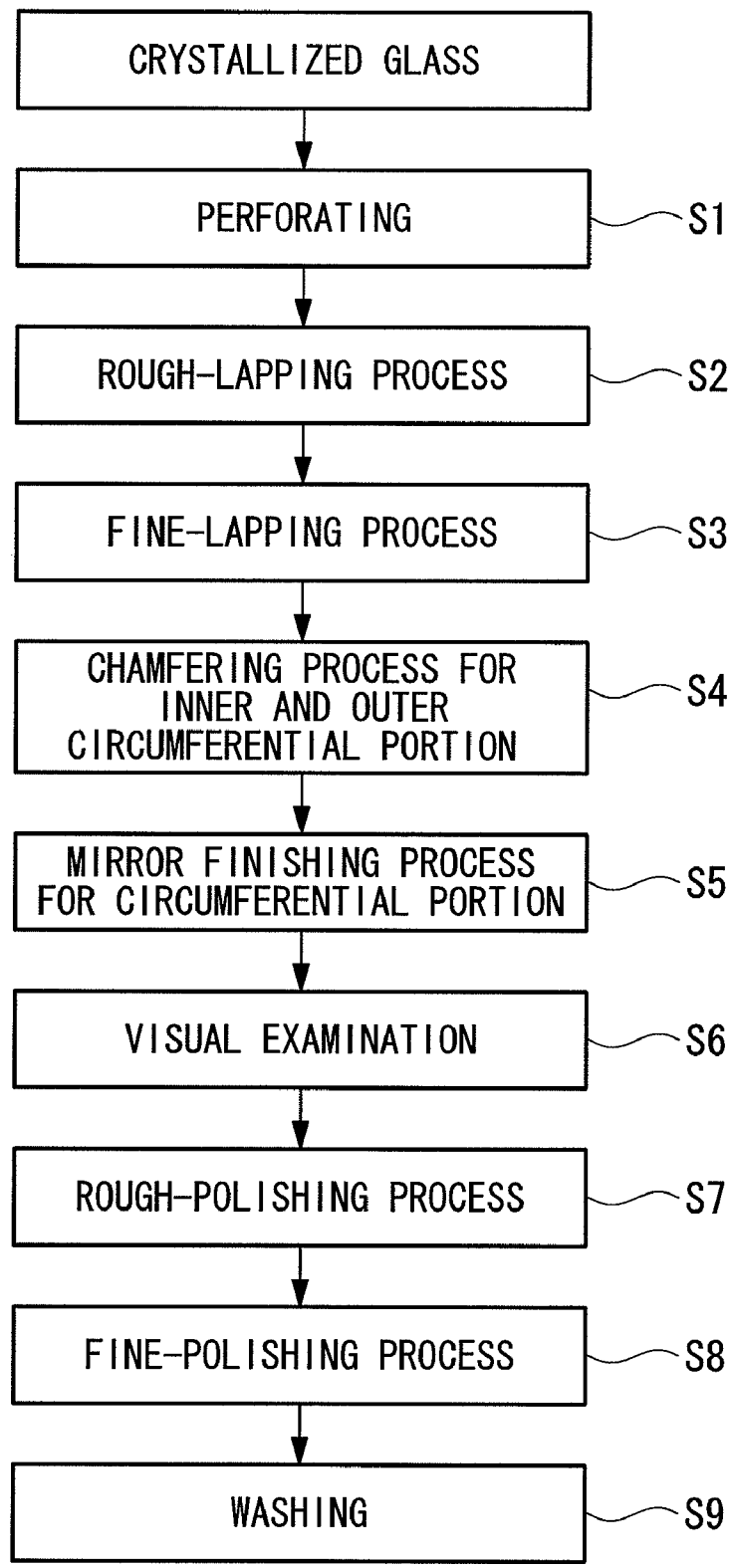
FIG. 3 is a flow diagram illustrating one example of the process of producing the magnetic disk substrate of the present invention.

Hereinafter, the embodiments of the present invention are described by referring to the figures. However, the present invention is not limited to the embodiments as described below.

FIG. 1A illustrates the amplitude Wa of the waviness. FIG. 1B illustrates the average amplitude Wb of the microwaviness in the present invention. In FIG. 1A, Wa represents the amplitude of the waviness. In FIG. 1B, Wb represents the average amplitude of the microwaviness.

FIG. 2 is a diagram showing one example of the magnetic recording medium of the present embodiments.

In FIG. 2, "1" shows a magnetic recording medium. The magnetic recording medium 1 includes a magnetic disk substrate 2; and primary coats 3 of chromium alloy, magnetic layers 4 of cobalt alloy, and carbon layers 5 of diamond-like carbon which are formed in order on both sides of magnetic disk substrate 2.

In the magnetic disk substrate 2 shown in FIG. 2, the amplitude Wa of the waviness is within the range of 0.1 nm to 0.5 nm, the average amplitude Wb of the microwaviness is 0.3 nm or less, and the value calculated by dividing the average amplitude Wb of the microwaviness by the amplitude Wa of the waviness, namely Wb/Wa, is 0.6 or more.

When the amplitude Wa of the waviness of the substrate is over 0.5 nm or when the average amplitude Wb of the microwaviness is over 0.3 nm, the electromagnetic conversion characteristics of the magnetic recording medium 1 become inferior, and therefore, such conditions are not preferable. Also, when the amplitude Wa of the waviness of the substrate is less than 1 nm or when the value calculated by dividing the average amplitude Wb of the microwaviness by the amplitude Wa of the waviness, namely Wb/Wa, is less than 0.6, it is required for the production to take a lot of time and effort, the yield gets worse, and it would be difficult to mass-produce. In particular, the substrate whose amplitude Wa of the waviness is less than 0.1 nm is difficult to produce.

Also, the magnetic disk substrate 2 shown in FIG. 2 can be made from glass, but this may be made from silicon.

The substrate 2 for magnetic disks, for example, can be produced by way of the method described below.

Firstly, glass is prepared as a raw material for the magnetic disk substrate 2, this raw material glass is molten, mixed and pressed, and a plate of glass which is disk-shaped is made. Then, the crystal nuclei are formed and the crystals are formed therein by heat-treating the obtained plate of glass, a crystallized glass is formed in which the crystal phases are lithium disilicate and α-quartz, particles of the aggregated α-quartz are dispersed on the glass.

Next, as illustrated in FIG. 3, the plate of crystallized glass is perforated with a cylindrical grinding stone, a central aperture is formed in the central portion of the plate of crystallized glass, and a substrate is prepared (S1). After this, a two-stage lapping process, namely a rough-lapping process (S2) and a fine-lapping process (S3) is conducted on one side of the obtained substrate which becomes a main surface, so that the width and surface-roughness of the substrate are adjusted. Then, the inner and outer circumferential portions of the substrate are chamfered in a chamfering process (S4) in order to form chamfered portions.

After the chamfering process, the inner and outer circumferential portions of the substrate are mirror-finished in a mirror finishing process (S5), and a visual examination is conducted thereon (S6).

In the next polishing process, the two steps of (1) a rough-polishing process (S7) and (2) a fine-polishing process (S8) are conducted.

The rough-polishing process of (1) is conducted by using a device which can polish both sides of a substrate, and an abrasive containing cerium oxide.

Furthermore, the main surface of the substrate is mirror-finished by conducting the fine-polishing process (S8).

Also, the fine-polishing process can be carried out by using the device which can polish the both sides of substrate, and an abrasive containing at least one of cerium oxide powder and colloidal silica. It is preferable that the abrasive whose particle size is 0.1 μm to 1 μm be used in the fine-polishing process. If the particle size of the abrasive is over 1 μm, the amplitude Wa of the waviness tends to be large, and therefore, it is not preferable. If the particle size of the abrasive is less than 0.1 μm, its processing rate is lowered, and it is difficult to mass-produce. In addition, when plural abrasives are mixed for use, it may include abrasives which are different in particle size.

Also, in the fine-polishing process, a pad made from a urethane or suede can be used.

Finally, the magnetic disk substrate shown in FIG. 2 can be obtained by washing the substrate (S9).

In order to produce the magnetic recording medium 1 shown in FIG. 2 using the magnetic disk substrate 2 obtained in this way, at first, the magnetic disk substrate 2 is mounted in sputtering equipment, and primary coats 3 made from chromium alloy, and magnetic layers 4 made from cobalt alloy are successively formed on both sides of the magnetic disk substrate 2 by way of sputtering. Then, the carbon layers 5 made from diamond-like carbon are formed on the magnetic layers 4 by way of the CVD method, and the magnetic recording medium 1 shown in FIG. 2 can be obtained. In addition, the carbon layers 5 may be coated with Fonblin Z-Tetraol (produced by Sovay Solexis Inc.) as a lubricant.

EXAMPLE

Hereinafter, an example is shown in order to demonstrate the beneficial effects of the present invention. However, the present invention is not limited to the embodiments verified below.

Next, a central aperture was formed in the central portion of the plate of crystallized glass by using a cylindrical grinding stone, and a substrate was prepared. Then, the two-stage lapping process including a rough-lapping process and fine-lapping process was conducted to one side of the obtained substrate which became a main surface by using a polishing device which can polish the both sides of substrate and uses a diamond pellet, and the thickness and surface-roughness of the substrate were adjusted. Then, the inner circumferential portion of the substrate, which fronts on the central aperture, and the outer circumferential portion were chamfered with a grinding stone by using an internal-external processing device, and chamfered portions are formed.

After the chamfering process, the inner and outer circumferential portion was mirror-finished, visual examinations were conducted thereon, and the main surfaces of the substrates were finally mirror-finished by using the polishing device which can polish the both sides of substrate. This polishing process included a rough-polishing step and fine-polishing step. The abrasive containing cerium oxide powder (ceria) ("ROX" produced by Showa Denko K.K.), and colloidal silica ("Compol" produced by Fujimi Incorporated) was used therein. Commercially available urethane or suede pads were used for polishing them. Finally, each magnetic disk substrate corresponding to Test Cases 1 to 12 were obtained, which were different in the amplitudes Wa of the waviness, and the average amplitudes Wb of the microwaviness, but had an identical diameter of 65 mm, and internal diameter of 20 mm.

The abrasives used in the fine-polishing process, and their particle sizes are shown in Table 1.

TABLE 1

| Case # | Wa (nm) | Wb (nm) | Wb/Wa | Abrasive | Particle size of abrasive (μm) | Yield | Evaluation of Yield | Electromagnetic conversion characteristics | Electromagnetic conversion characteristics |
|---|---|---|---|---|---|---|---|---|---|
| 1 | 0.78 | 0.35 | 0.45 | Ceria | 0.8 | 1.85 | Good | 0.89 | Bad |
| 2 | 0.75 | 0.29 | 0.39 | Ceria | 0.8 | 1.62 | Good | 0.90 | Bad |
| 3 | 0.62 | 0.19 | 0.31 | Ceria | 0.8 | 1.56 | Good | 0.92 | Bad |
| 4 | 0.61 | 0.18 | 0.30 | Ceria | 0.8 | 1.35 | Good | 0.94 | Bad |
| 5 | 0.42 | 0.19 | 0.45 | Ceria | 0.2 | 0.85 | Bad | 1.01 | Good |
| 6 | 0.39 | 0.21 | 0.54 | Ceria | 0.2 | 0.83 | Bad | 1.00 | Good |
| 7 | 0.32 | 0.16 | 0.50 | Ceria | 0.2 | 0.73 | Bad | 1.02 | Good |
| 8 | 0.30 | 0.22 | 0.73 | Ceria/Colloidal silica | 0.45/0.08 | 1.00 | Good | 1.00 | Good |
| 9 | 0.21 | 0.23 | 1.10 | Ceria/Colloidal silica | 0.45/0.08 | 0.97 | Good | 1.00 | Good |
| 10 | 0.2 | 0.32 | 1.60 | Ceria | 0.45 | 0.12 | Good | 0.95 | Bad |
| 11 | 0.25 | 0.14 | 0.56 | Colloidal silica | 0.08 | 0.27 | Bad | 1.04 | Good |
| 12 | 0.2 | 0.09 | 0.45 | Colloidal silica | 0.06 | 0.08 | Bad | 1.07 | Good |

(Test Cases 1 to 12)

A raw material glass mainly including 77% of $SiO_2$, 11% of $Li_2O$, 4% of $Al_2O_3$, and 3% of MgO was prepared as a material for each magnetic disk substrate. The raw material glass was molten at approximately 1350° C. to 1500° C. by using a melting device, and this was mixed, pressed and cooled, and a disk-like plate of glass having a diameter of 66 mm, and width of about 1 mm was obtained. Then, the obtained plate of glass was heat-treated at 540° C. for about five hours to form crystal nuclei, the crystals were formed at 780° C. for two hours, and the crystallized glass was formed in which the crystal phases were lithium disilicate and α-quartz, and particles of the aggregated α-quartz were dispersed on the glass.

The above-obtained substrates of Test Cases 1 to 12 were scrub-brush washed, further ultrasonically cleaned in an oxalic acid solution, and extraneous matters attached on the surfaces were removed. Then, the amplitudes Wa of the waviness, and the average amplitudes Wb of the microwaviness of the substrates were measured. The results are shown in Table 1.

The amplitudes Wa were obtained by using a interferometer "OptiFlat" produced by ADE Phase Shift, Inc. with a high-pass filter of 5 mm. Also, the average amplitudes Wb of the microwaviness were measured at a measuring wavelength of 30 μm to 200 μm by using MicroXam with a band-pass filter.

With regard to the substrates of Test Cases 1 to 12, their yields were evaluated. The results are shown in Table 1.

The results of the processing rates measured in the fine polishing processes are evaluated as the followings:

Good: the relative value of the processing rate was 1 or more when the processing rate of Test Case 8 was regarded as 1; or Bad: the relative value of the processing rate was less than 1 when the processing rate of Test Case 8 was regarded as 1.

Each of the substrates of Test Cases 1 to 12 was texture-treated by using a non-woven fabric and a diamond slurry, then loaded into sputtering equipment, and primary coats of chromium alloy and magnetic layers of cobalt alloy were formed on both sides of the substrate by way of sputtering. Then, diamond-like carbon layers were formed thereon by way of the CVD method, a lubricant "Fonblin Z-Tetraol" (produced by Solvay Solexis, Inc.) was coated thereon, and a magnetic recording medium was produced.

In addition, the sum of the thicknesses of the primary coat and the magnetic layer was 90 nm, and the thickness of the diamond-like carbon layer was 10 nm.

Next, with regard to the above-obtained magnetic recording media of Test Cases 1 to 12, their electromagnetic conversion characteristics were measured by using an electromagnetic conversion characterisitics analyzer produced by Guzik Technical Enterprises. The results are shown in Table 1.

In addition, the results of the electromagnetic conversion characteristics were evaluated as the following:

Good: the relative value of the electromagnetic conversion characteristics was 1 or more when the electromagnetic conversion characteristics of the Test Case 8 were regarded as 1; or Bad: the relative value of the electromagnetic conversion characteristics was less than 1 when the electromagnetic conversion characteristics of the Test Case 8 were regarded as 1.

The results shown in Table 1 revealed that the substrates of Test Cases 1 to 4, whose amplitudes Wa of the waviness of the substrate were over 0.5 nm, had inferior electromagnetic conversion characteristics. Also, it was revealed that those of Test Cases 1 and 10, whose average amplitudes Wb of the microwaviness were over 0.3 nm, had inferior electromagnetic conversion characteristics.

Furthermore, it was confirmed that those of Test Cases 5 to 7, 11, and 12, whose values calculated by dividing the average amplitudes Wb of the microwaviness by the amplitudes Wa of the waviness, namely Wb/Wa were less than 0.6, had inferior yield even though they had superior electromagnetic conversion characteristics.

INDUSTRIAL APPLICABILITY

According to the present invention, a magnetic disk substrate which can achieve a magnetic recording medium compatible with high recording density, and has excellent electromagnetic conversion characteristics can be mass-produced. Therefore, the present invention is highly applicable to the field of information technology or the like.

The invention claimed is:

1. A magnetic disk substrate, wherein
 an amplitude Wa of a waviness on a surface measured by using an interferometer for a versatile disk at a measuring wave-length of 5.0 mm is within the range of 0.2 nm to 0.5 nm;
 an average amplitude Wb of a microwaviness generated on the waviness measured by using a microscopy for three-dimensional surface-structural analysis at a measuring wave-length of 30 µm to 200 µm is 0.09 to 0.3 nm or less; and
 a value of Wb/Wa, which is calculated by dividing the average amplitude Wb of the microwaviness by the amplitude Wa of the waviness is 0.45 to 1.10.

2. The magnetic disk substrate according to claim 1 which is made from glass.

3. A magnetic recording medium which comprises the magnetic disk substrate according to claim 1.

4. A magnetic recording medium which comprises the magnetic disk substrate according to claim 2.

* * * * *